United States Patent
Noh

(10) Patent No.: US 8,704,931 B2
(45) Date of Patent: Apr. 22, 2014

(54) APPARATUS AND METHOD OF PHOTOGRAPHING MOVING IMAGE

(75) Inventor: Dae Jong Noh, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 340 days.

(21) Appl. No.: 12/897,065

(22) Filed: Oct. 4, 2010

(65) Prior Publication Data

US 2011/0085059 A1    Apr. 14, 2011

(30) Foreign Application Priority Data

Oct. 8, 2009  (KR) .................. 10-2009-0095551

(51) Int. Cl.
  *H04N 5/222*  (2006.01)
  *H04N 5/76*  (2006.01)
(52) U.S. Cl.
  USPC .................................. 348/333.05; 348/231.2
(58) Field of Classification Search
  USPC .................. 348/333.01, 333.05, 220.1, 231.2, 348/231.3
  See application file for complete search history.

(56) References Cited

U.S. PATENT DOCUMENTS

| | | | | |
|---|---|---|---|---|
| 7,196,727 | B2* | 3/2007 | Sato | 348/333.11 |
| 2002/0154226 | A1* | 10/2002 | Gohda | 348/231.3 |
| 2004/0081429 | A1* | 4/2004 | Sugano et al. | 386/69 |
| 2007/0071404 | A1* | 3/2007 | Curtner et al. | 386/95 |
| 2008/0247677 | A1* | 10/2008 | Yoshino | 382/305 |
| 2009/0285565 | A1* | 11/2009 | Nakamura | 386/117 |

FOREIGN PATENT DOCUMENTS

| | | |
|---|---|---|
| KR | 1020070031691 | 3/2007 |
| KR | 1020090072556 | 7/2009 |

OTHER PUBLICATIONS

Korean Office Action dated Sep. 5, 2013 issued in KR Application No. 10-2009-0095551.

* cited by examiner

*Primary Examiner* — Nhan T Tran
(74) *Attorney, Agent, or Firm* — Stanzione & Kim, LLP

(57) ABSTRACT

An apparatus and method to generate a thumbnail image in a moving image photographing mode, and storing the generated thumbnail image are disclosed. The apparatus to photograph the thumbnail image generates a thumbnail image at intervals of a predetermined time simultaneously with photographing the moving image. In addition, the apparatus selects a thumbnail image to be preserved and a thumbnail image to deleted from among generated thumbnail images in such a manner that the number of generated thumbnail images does not exceed a predetermined number, thereby limiting the number of generated thumbnail images.

40 Claims, 9 Drawing Sheets

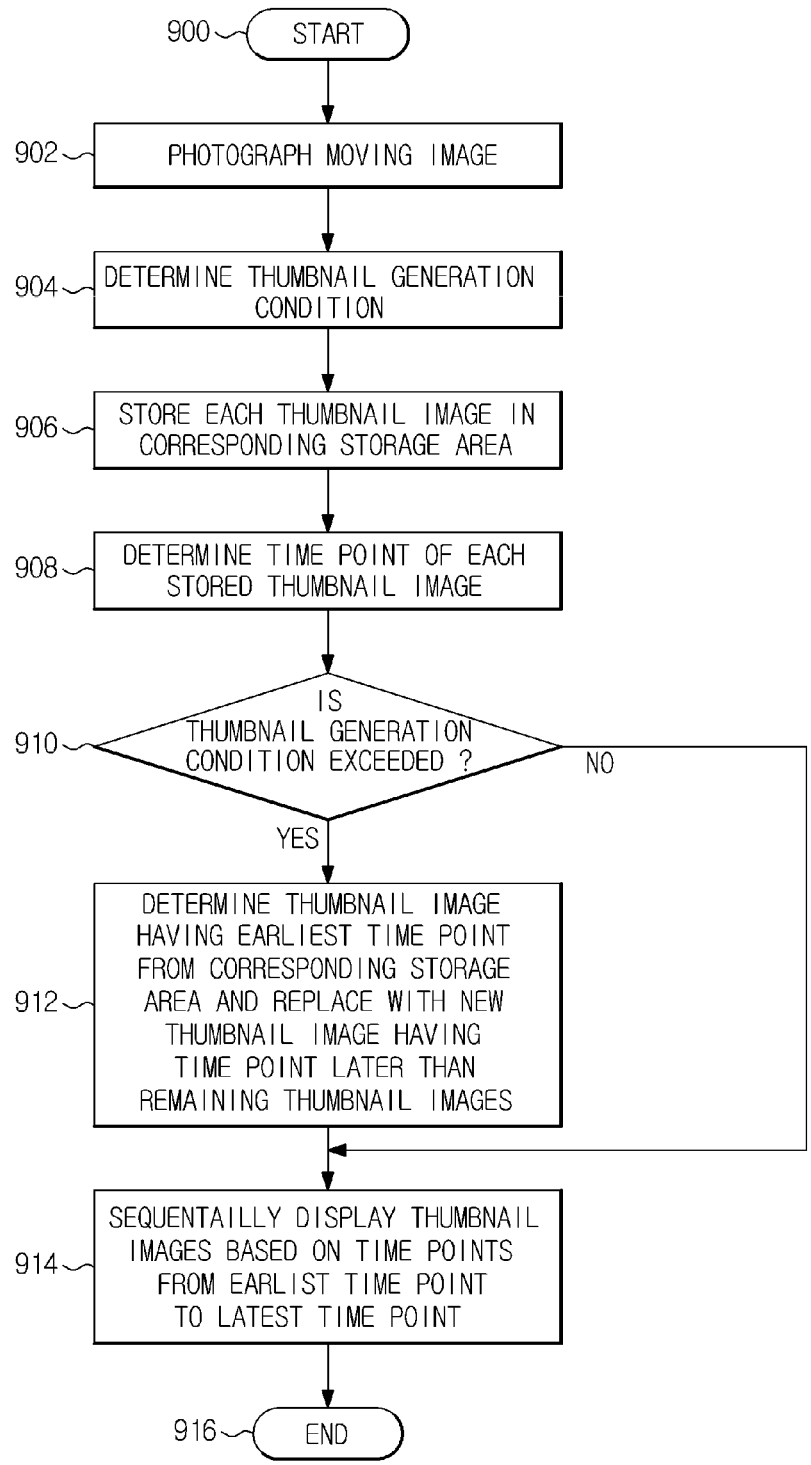

APPARATUS AND METHOD OF PHOTOGRAPHING MOVING IMAGE

CROSS-REFERENCE TO RELATED APPLICATIONS

This application claims priority under 35 USC §119 from Korean Patent Application No. 2009-0095551, filed on Oct. 8, 2009 in the Korean Intellectual Property Office, the disclosure of which is incorporated herein by reference.

BACKGROUND

1. Field of the Invention

Embodiments of the present general inventive concept relate to an apparatus and method of photographing a moving image to limit the number of thumbnail images by adjusting a time interval between thumbnail images being generated in real time when the moving image is photographed.

2. Description of the Related Art

Generally, a moving image photographing apparatus having a photographing function, such as a camcorder, a digital camera, or a mobile camera phone, photographs a moving image, and records the moving image in a recording medium, such as a flash memory, a hard disc, or the like. With the increasing development of recording medium technology, storage capacity is continuously increasing and access speed is also rising, so that moving images having been photographed by the moving image photographing apparatus over a long period of time can be recorded and reproduced.

As the moving image photographing apparatus can store high-capacity moving images therein, a time needed to search for a desired moving image in a plurality of stored moving images is also increased. In order to reduce the time needed to search for the desired moving image, there is proposed a new method capable of generating the principal scenes of the moving images as thumbnail images, and searching for a desired scene using the generated thumbnail images.

According to the above-mentioned method to generate thumbnail images when the photographed moving image file stored in the recording medium is reproduced, a predetermined time is needed for a process in which a few representative images are extracted from the photographed moving images and converted into other formats of such thumbnail images, so that a user who wants to use such thumbnail images must wait a significantly long period of time until such thumbnail images are actually utilized.

In the meantime, a method of storing a thumbnail image at intervals of a predetermined time simultaneously while photographing a moving image may have less necessity of additionally generating thumbnail images. However, the longer the photographing time of the moving image, the higher the number of generated thumbnail images. As a result, the above-mentioned method is unable to satisfy an original intention of a user who wants to easily and rapidly search for a desired scene in the stored moving image file.

SUMMARY

Therefore, it is a feature of the present general inventive concept to provide an apparatus and method of photographing a moving image to limit the number of thumbnail images by adjusting a time interval between thumbnail images being generated in real time when the moving image is photographed, so as to enable easy and rapid search for a desired moving image.

Additional features of the present general inventive concept will be set forth in part in the description which follows and, in part, will be obvious from the description, or may be learned in practice.

In accordance with one feature of the present general inventive concept, a method of photographing a moving image in which a thumbnail image is generated from the photographed moving image includes establishing a thumbnail generation condition to generate the thumbnail image, limiting a number of thumbnail images being generated according to the established thumbnail generation condition while the moving image is photographed, and storing thumbnail information to reproduce the limited number of thumbnail images.

The thumbnail generation condition may include the number of thumbnail images and a time interval between the generated thumbnail images.

The thumbnail generation condition may be established or changed by a user.

The thumbnail generation condition may be established by a manufacturer who manufactures a moving image photographing apparatus having a function to photograph the moving image.

The limiting of the number of thumbnail images may limit the number of generated thumbnail images from exceeding a predetermined number of thumbnail images by adjusting the time interval between the thumbnail images.

The adjusting of the time interval between the thumbnail images may increase a time interval between newly generated thumbnail images as compared to a time interval between previously generated thumbnail images as a time period over which a moving image is photographed increases.

The increasing of the time interval between the thumbnail images may include increasing the time interval between the newly generated thumbnail images using a Fibonacci sequence.

The increasing of the time interval between the thumbnail images may include increasing the time interval between the newly generated thumbnail images by 2 k times (where k=0, 1, 2, . . . ) as compared to the time interval between the previously generated thumbnail images.

If the number of generated thumbnail images exceeds a predetermined number of generated thumbnail images, the limiting of the number of thumbnail images may select a predetermined number of thumbnail images from among the previously-generated and newly-generated thumbnail images.

The selection of the thumbnail images may include selecting as many thumbnail images as a number of thumbnail images exceeding the predetermined number of thumbnail images as thumbnail images to be deleted, and maintaining the remaining thumbnail images other than the selected thumbnail images.

Another feature may include selecting the earliest thumbnail image from among the previously generated thumbnail images to be deleted.

The method may further include selecting a thumbnail image to be deleted by comparing time intervals among thumbnail images with one another at a specific time point where the moving image is photographed.

The specific time point may be established or changed by a user.

The specific time point may be established by a manufacturer who manufactures a moving image photographing apparatus having a function to photograph the moving image.

The method may further include, if the number of thumbnail images having the longest time interval at the specific time point is a plural number (i.e. more than one thumbnail image) according to the result of the comparison of the time intervals among the thumbnail images, selecting any one of the thumbnail images at random, deleting the earliest thumbnail image, and/or deleting the most recent thumbnail image.

The method may further include primarily maintaining a specific thumbnail image among the previously generated thumbnail images when the moving image is photographed, and selecting a thumbnail image to be deleted among the remaining thumbnail images other than the specific thumbnail image.

The selecting of the thumbnail image to be deleted among the remaining thumbnail images other than the specific thumbnail image may include selecting the earliest thumbnail image from among the remaining thumbnail images as a thumbnail image to be deleted.

The selecting of the thumbnail image to be deleted among the remaining thumbnail images other than the specific thumbnail image may include selecting a thumbnail image to be deleted by comparing time intervals among the remaining thumbnail images at the specific time point where the moving image is photographed.

The thumbnail information may include image data of the limited number of thumbnail images and an index indicating each position of the limited number of thumbnail images.

The thumbnail information may be stored in a header of a file including the moving image or be stored as an additional external file.

In accordance with another feature of the present general inventive concept, an apparatus to photograph a moving image in which a thumbnail image is generated from the photographed moving image includes a photographing unit to photograph the moving image, and a controller to control an operation to store not only a limited number of thumbnail images generated according to a thumbnail generation condition while the photographing unit photographs the moving image, but also thumbnail information to reproduce the limited number of thumbnail images.

The apparatus may further include a storage unit to store a file of the photographed moving image and the thumbnail information, and an input unit to allow a user to establish the thumbnail generation condition.

The thumbnail information may include image data of the limited number of thumbnail images and an index indicating each position of the limited number of thumbnail images, and the thumbnail information may be stored in a header of the moving image file or stored as an additional external file.

The controller may include a thumbnail generator to generate the thumbnail images in real time when the moving image is photographed and limit the number of generated thumbnail images from exceeding a predetermined number of thumbnail images.

The thumbnail generator may limit the number of thumbnail images by adjusting a time interval between the generated thumbnail images.

The thumbnail generator may increase a time interval between newly generated thumbnail images as compared to a time interval between previously generated thumbnail images, as a moving image photographing time increases.

The thumbnail generator may increase a time interval between newly generated thumbnail images using a Fibonacci sequence.

The thumbnail generator may increase a time interval between newly generated thumbnail images by 2 k times (where k=0, 1, 2, . . . ) as compared to a time interval between previously generated thumbnail images.

If the number of generated thumbnail images exceeds the predetermined number of generated thumbnail images, the thumbnail generator may select a predetermined number of thumbnail images from among the previously-generated and newly-generated thumbnail images.

The thumbnail generator may select as many thumbnail images as a number of thumbnail images exceeding the predetermined number of thumbnail images as thumbnail images to be deleted, and maintain the remaining thumbnail images other than the selected thumbnail images.

The thumbnail generator may select the earliest thumbnail image from among the previously generated thumbnail images as a thumbnail image to be deleted.

The thumbnail generator may select a thumbnail image to be deleted by comparing time intervals among thumbnail images with one another at a specific time point where the moving image is photographed.

If the number of thumbnail images having the longest time interval at the specific time point is a plural number (i.e., more than one thumbnail image) according to the result of the comparison of the time intervals among the thumbnail images, the thumbnail generator may select any one of the thumbnail images at random, delete the earliest thumbnail image, and/or delete the most recent thumbnail image.

The thumbnail generator may primarily maintain a specific thumbnail image among previously generated thumbnail images when the moving image is photographed, and select a thumbnail image to be deleted among the remaining thumbnail images other than the specific thumbnail image.

The thumbnail generator may select the earliest thumbnail image from among the remaining thumbnail images other than the specific thumbnail image as a thumbnail image to be deleted.

The thumbnail generator may select a thumbnail image to be deleted by comparing time intervals among the remaining thumbnail images other than the specific thumbnail image at the specific time point where the moving image is photographed.

In accordance with another feature of the present general inventive concept, an apparatus to photograph a moving image in which a thumbnail image is generated from the photographed moving image includes a photographing unit to photograph the moving image, and a controller to record information of the moving image photographed by the photographing unit, to generate thumbnail information using image information extracted from the moving image information, and to record the generated thumbnail information, wherein the controller generates the thumbnail information while simultaneously extracting image information from the moving image over a gradually increasing period of time.

In another feature, an apparatus to photograph a moving image and to generate a plurality of thumbnail images from the photographed moving image includes a photographing unit to photograph the moving image, a memory unit including a plurality of storage areas to store the thumbnail images, and a controller to control storage of a thumbnail image among the plurality of thumbnail images in a corresponding storage area among the plurality of storage areas and to determine a time point at which each thumbnail image was generated with respect to the moving image and to display each thumbnail image stored in the corresponding storage area according to the time period.

In yet another feature, a method of displaying thumbnail images corresponding to a photographed moving image includes photographing the moving image, generating a plurality of original thumbnails images based on the moving image according to a predetermined thumbnail generation condition, storing each thumbnail image among the plurality of original thumbnail images in a corresponding storage area among a plurality of storage areas based on a predetermined thumbnail general condition, determining a time point of each stored thumbnail image corresponding to a point in time of the moving image, replacing a first thumbnail image having an earliest time point among the plurality of original thumbnail images with a new thumbnail image having a latest time point among the plurality of thumbnail images, and sequentially displaying the thumbnail images based on the corresponding time points, wherein the new thumbnail image having the latest time point is displayed after displaying the plurality of original thumbnail images.

In still yet another feature, an apparatus to photograph an object image includes a photograph unit to photograph an object image, and a controller to generate one or more still images based on the photographed object image, wherein the controller determines the number of still images according to a time period during which the photograph unit photographs the image.

BRIEF DESCRIPTION OF THE DRAWINGS

These and/or other features of the present general inventive concept will become apparent and more readily appreciated from the following description of exemplary embodiments, taken in conjunction with the accompanying drawings of which:

FIG. 9 is a flowchart illustrating a method of displaying thumbnail images according to an exemplary embodiment of the present general inventive concept.

DETAILED DESCRIPTION OF THE EMBODIMENTS

Figure 1:
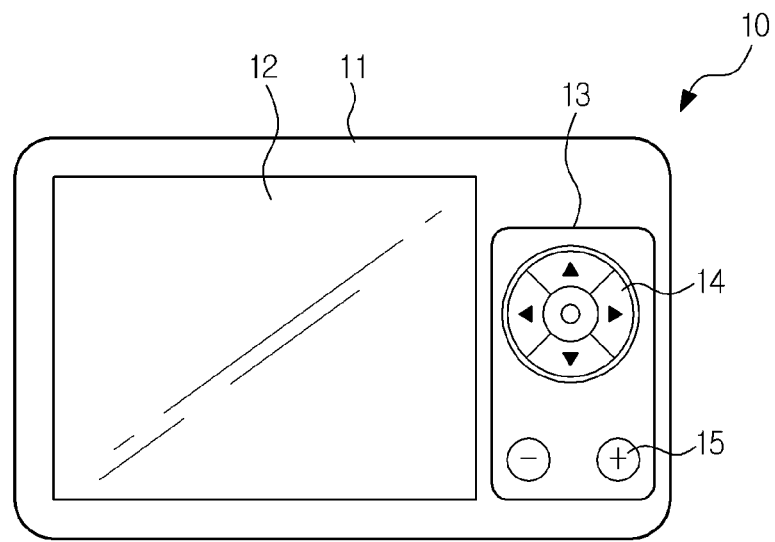
FIG. 1 shows the appearance of a moving image photographing apparatus according to an exemplary embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below in order to explain the present general inventive concept by referring to the figures.

Figure 2:
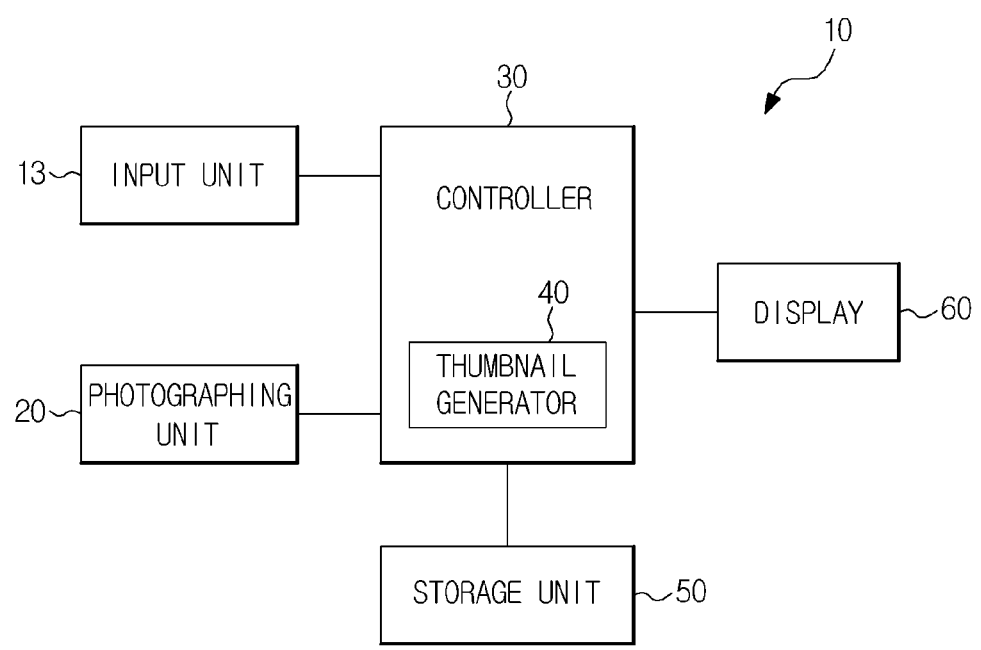
FIG. 2 is a control block diagram illustrating a moving image photographing apparatus according to an exemplary embodiment of the present general inventive concept.

FIG. 1 shows the appearance of a moving image photographing apparatus according to an exemplary embodiment of the present general inventive concept. FIG. 2 is a control block diagram illustrating a moving image photographing apparatus according to an exemplary embodiment of the present general inventive concept.

The moving image photographing apparatus 10 includes a main body 11, a screen 12 installed at one side of the main body 11, and an input unit 13. Although the exemplary embodiment shows the moving image photographing apparatus 10 as a digital camera having a photographing function, the moving image photographing apparatus 10 is not limited only to the digital camera, and is also applicable to other devices, such as a camcorder or camera phone, to photograph such moving images and to store the photographed moving images in a recording medium The input unit 13 may allow a user to select a desired function among a plurality of functions. The input unit 13 may include a first button 14 and a second button 15. The first button 14 may be manipulated by a user to establish a thumbnail generation condition, for example, a resolution of the photographed image, the number of thumbnail images, a time interval between thumbnail images, and the like. Alternatively, the thumbnail general condition may be preset by a manufacture of the moving image photographing apparatus 10, as discussed in greater detail below. The second button 15 may be used to zoom in or out from the image displayed on the screen 12. The input unit 13 may be used to search for or edit a file of a moving image displayed on the screen 12 using the buttons 14 and 15, and may also confirm a desired scene by searching for the generated thumbnail images. Although references are made to thumbnails throughout the application, it can be appreciated that the quality and/or resolution is not limited to any certain resolution or quality. Accordingly, high resolution and/or high quality still frame images i.e., still images, may be generated based on the photographed moving image, as accordingly to the teachings described below.

If the user photographs a moving image simultaneously while viewing a target object displayed on the screen 12, data of the moving image photographed by the photographing unit 20 is stored in the storage unit 50 by the controller 30. The photographed moving image is stored in a recording medium of the storage unit 50. It is not necessary for the recording medium to be embedded in the main body, and an external memory capable of receiving image data via a connection port and storing the received image data therein may also be used as necessary.

The controller 30 controls the moving image photographing device 10 to photograph a moving image in response to a user command entered through the input unit 13. Further, the controller 30 may control playback of the photographed moving image on the display 60 in real time, and/or may control the photographed moving image to be stored in the storage unit 50. The controller 30 further includes a thumbnail generator 40 to generate thumbnail images in real time while the moving image is photographed.

If the photographing time of the moving image is short, a small number of thumbnail images may be generated. However, as the moving image photographing mode is continuously maintained, the number of generated thumbnail images may increase. If the number of generated thumbnail images is excessively increased, the user may have difficulty in searching for a desired moving image. Accordingly, is may be desirable to limit the number of thumbnail images below a predetermined number.

Generation of thumbnail images is carried out in real time in conjunction with the photographing of a moving image including such thumbnail images. In this case, a user may decide duration of the photographing mode to photograph the moving image so that it may be impossible to predict a time interval to generate a predetermined number of thumbnail images. Therefore, in accordance with an above exemplary embodiment of the present general inventive concept, a time interval between generated thumbnail images is adjusted according to a photographing time, i.e., a time over which a moving image is photographed, so that the number of thumbnail images is limited to the predetermined number when the photographing mode is ended.

Figure 3:
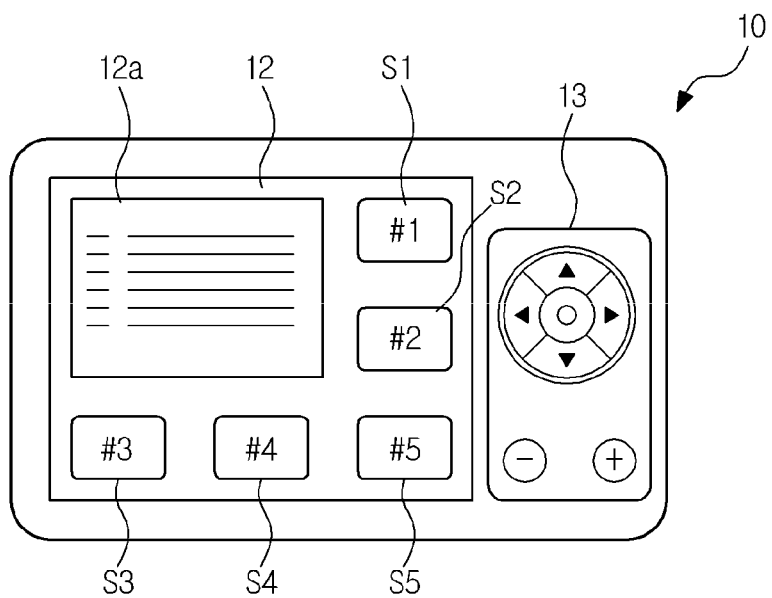
FIG. 3 illustrates thumbnail images of the moving image photographing apparatus according to an exemplary embodiment of the present general inventive concept.

The user may search for stored thumbnail images after the photographing mode has been ended. As shown in FIG. 3, the screen 12 includes text data 12a to display additional information related to the thumbnail images, and a plurality of thumbnail images S1, S2, S3, S4 and S5 generated when the moving image is photographed. The additional information may include, but is not limited to, index information of a corresponding thumbnail image that indicates a location of the thumbnail image within the stored photographed moving image. Although the above embodiment of the present general inventive concept has exemplarily disclosed only five thumbnail images as shown in FIG. 3, this number of thumbnail images is not limited to 5. For example, the number of thumbnail images to be stored may be changed to another number by a user who views a menu image that is provided under the control of the controller 30, and establishes a thumbnail generation condition, using for example, the first button 14 included with the moving image photographing device 10.

Figure 4:
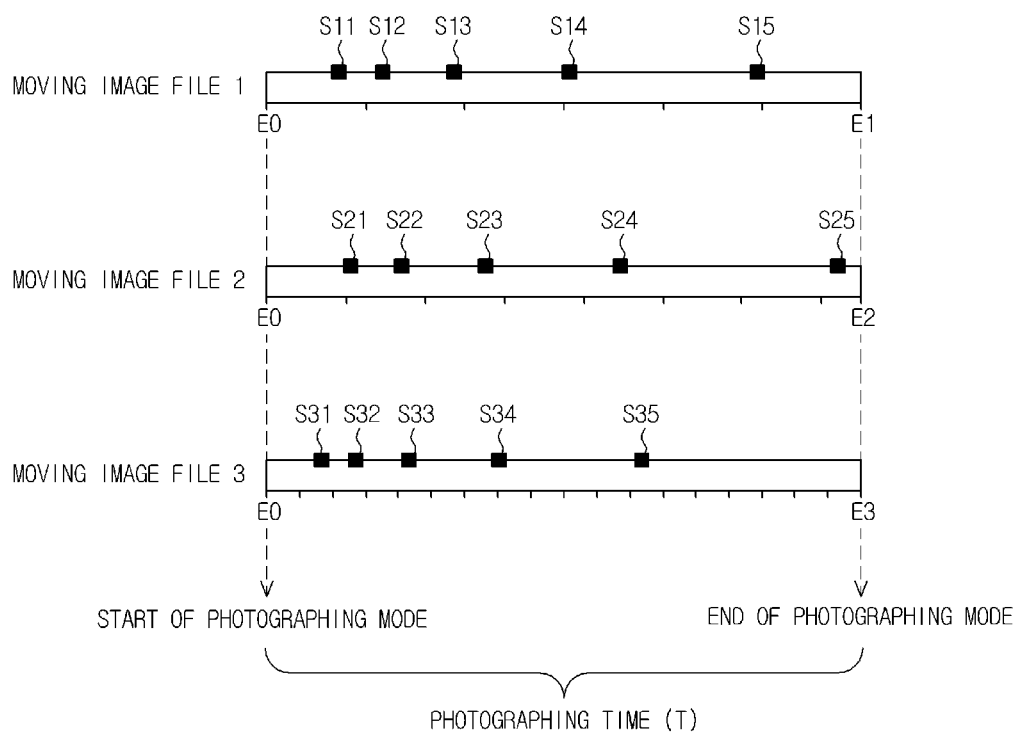
FIG. 4 illustrates time points of generating of thumbnail images of respective moving image files according to an exemplary embodiment of the present general inventive concept.

Referring to FIG. 4, time points at which thumbnail images of respective moving image files are generated according to an exemplary embodiment of the present general inventive concept. In FIG. 4, three moving image files 1, 2, and 3 are sequentially photographed and acquired, but have different photographing times ET, and each moving image file 1, 2, or 3 exemplarily generates 5 thumbnail images (Sn).

The moving image file 1 from among three moving image files 1, 2, and 3 has the shortest photographing time from E0 to E1, and the moving image file 3 has the longest photographing time from E0 to E3. The photographing of the moving image begins at the time point E0, and times where thumbnail images (Sn) are generated using some images of the moving image file differ according to respective photographing times. That is, the longer the photographing time period (E0-ET), the longer the time interval between thumbnail images, as can be seen from three moving image files 1, 2, and 3. For example, in the case of the first moving image file 1, a time interval between the second thumbnail image S12 and the third thumbnail image S13 is longer than a time interval between the first thumbnail image S11 and the second thumbnail image S12, a time interval between the third thumbnail image S13 and the fourth thumbnail image S14 is longer than each time interval among the previous thumbnail images (i.e., first, second, and third thumbnail images). Likewise, even in the case of the moving image file 2 or 3, a time interval between thumbnail images is increased according to the photographing time.

In order to increase a time interval between thumbnail images, the thumbnail generator 40 may use the Fibonacci sequence as represented by the following equation 1:

$$f_n = f_{n-1} + f_{n-2} \text{ (where, } f_n=0, f_1=1, n=2,3,4,\ldots)$$ [Equation 1]

In Equation 1, $f_n$ is a time interval between thumbnail images, and n is the order of generated thumbnail images.

Although the above-mentioned embodiment has exemplarily used the Fibonacci sequence, the exemplary embodiment is not limited only to the Fibonacci sequence, and all kinds of sequences capable of increasing a time interval between thumbnail images as compared to a time interval between previous thumbnail images may be freely applied to the embodiment of the present general inventive concept. For example, as the photographing time is increased, a time interval between thumbnail images is also increased by $2^k$ times (where k=0, 1, 2, ...).

In order to reproduce thumbnail images generated by the thumbnail generator 40 at a later time, the controller 30 stores image data of each generated thumbnail image and an index thereof in the storage unit 50. In this case, the index may include time information of each thumbnail image. That is, the index indicates location information of the thumbnails in the stored moving image file. The thumbnail information including the image data and the index may be included in a header of each moving image file, or may be stored as an additional file, including an external file.

Upon receiving a request from the user after the moving image photographing mode is ended, the controller 30 may display thumbnail images on the display 60 using the stored thumbnail information. Additionally, the user may easily search for a desired scene by referring to five thumbnail images S1, S2, S3, S4 and S5 displayed on the screen 12, as illustrated by the exemplary embodiment shown in FIG. 3.

Meanwhile, since the moving image photographing mode is maintained after a predetermined number of thumbnail images have been generated, a current time reaches a generation time of a new thumbnail image. In this case, the controller 30 determines the earliest generated thumbnail image among the previously generated thumbnail images to be a thumbnail image to be deleted. Thereafter, the controller 30 may store newly generated thumbnail images.

Figure 5:
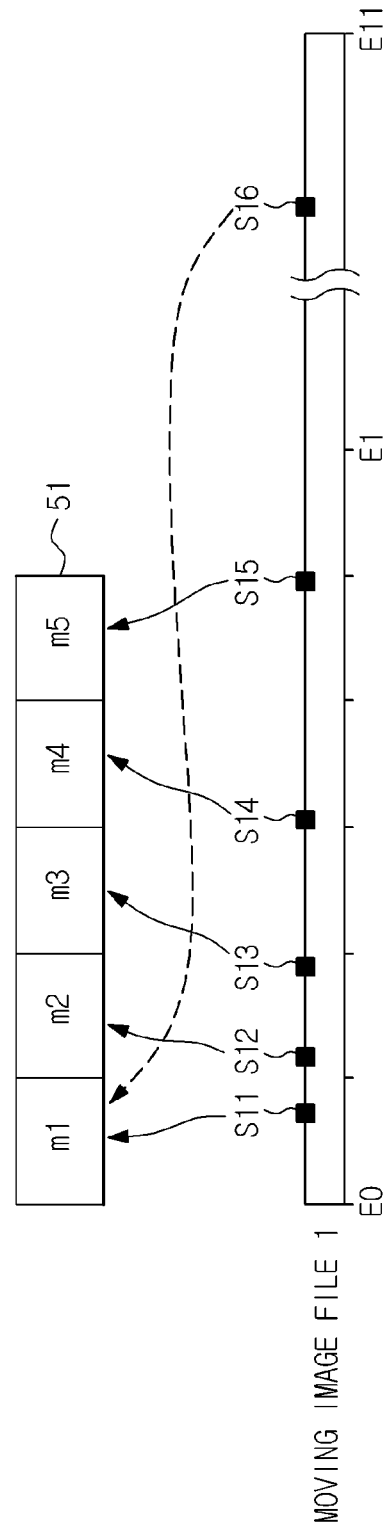
FIG. 5 is a conceptual diagram illustrating a method of storing a limited number of thumbnail images in a moving image file according to an exemplary embodiment of the present general inventive concept.

Referring to FIG. 5, whenever five thumbnail images S11, S12, S13, S14, and S15 are sequentially generated at time intervals that have been established in the moving image file 1 at an initial photographing mode, thumbnail information corresponding to the individual generated thumbnail images may be stored in corresponding memory addresses m1, m2, m3, m4, and m5 contained in a thumbnail storage area 51 of the storage unit 50. After that, if the moving image photographing mode is continued after the lapse of the time point E1 so that another time point where a new thumbnail image is generated begins, the earliest thumbnail information stored in the first memory address (m1) is deleted, and thumbnail information of a new thumbnail image S16 is stored instead of the deleted thumbnail information. Thereafter, if the moving image photographing mode is ended at a predetermined time point E11, thumbnail information of the five thumbnail images S12, S13, S14, S15, and S16 is stored in the storage unit 50. In this way, whenever a new thumbnail image is generated, the new thumbnail image may be stored in the storage area 51, instead of the earliest thumbnail images among the remaining previously generated thumbnail images.

Although the moving image photographing mode is continued over a long period of time, the number of thumbnail images remaining in the storage unit 50 is not higher than the predetermined number of thumbnail images.

Additionally, when the earliest thumbnail image is deleted and replaced with the new thumbnail image, the controller 30 may determine a new thumbnail image replay sequence corresponding to the stored thumbnail images, including the new thumbnail image. That is, although the new thumbnail image S16 is stored in memory address m1, which precedes thumbnail image S12-S15 stored in memory address m2-m5, the controller may read the thumbnail images S12-S15 from memory address m2-m5 before reading the new thumbnail image S16 from memory address m1. Accordingly, thumbnails S12-S16 may be replayed in sequence and consistent with the time over which the corresponding moving image was originally photographed.

Meanwhile, if a new thumbnail image is generated after the predetermined number of thumbnail images is generated, it should be noted that the earliest thumbnail image among previously generated thumbnail images is not always determined to be a thumbnail image to be deleted. Although it may be impossible to correctly predict the expiration time of the moving image photographing mode, there may be used another method that generates the predetermined number of thumbnail images by generating a weighted value at a specific time point while the moving image is photographed in consideration of the user's interest or the moving image contents.

Figure 6:
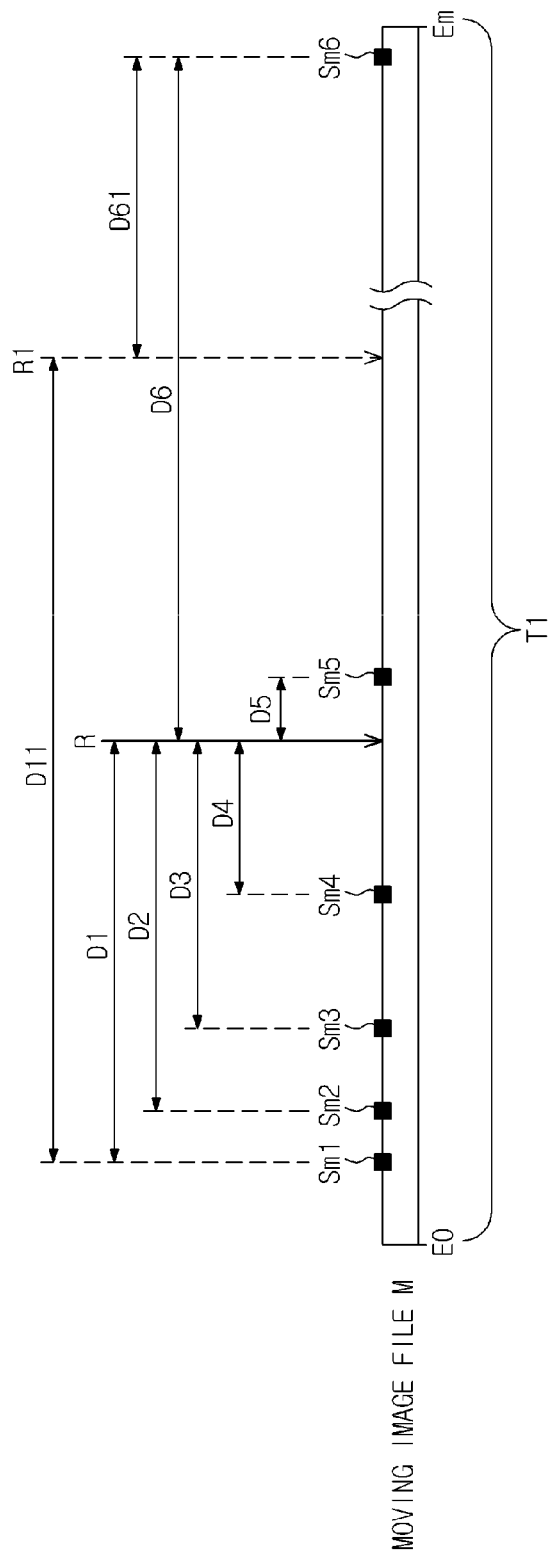
FIG. 6 is a conceptual diagram illustrating a method of selecting thumbnail images in a moving image file according to an exemplary embodiment of the present general inventive concept.

Referring to FIG. 6, a first specific time point R at which a weighted value is to be assigned means an absolute time starting from the beginning of the photographing mode, and may be established by a manufacturer of the moving image photographing apparatus and/or a user thereof. It may be possible to distinguish between a thumbnail image to be continuously maintained and another thumbnail image to be deleted according to a time interval between the specific time point R and each thumbnail image. For example, in the case where the photographing mode is continued although the first specific time point R has elapsed in the moving image file (m), and a new thumbnail image (Sm6) is generated after 5 thumbnail images (Sm1, Sm2, Sm3, Sm4, and Sm5) are generated, a time interval (D6) between the first specific time R and the new thumbnail image (Sm6) is longer than each of the time intervals (D1, D2, D3, D4 and D5) among the previously generated thumbnail images (Sm1, Sm2, Sm3, Sm4, and Sm5). In this case, the previously generated thumbnail images (Sm1, Sm2, Sm3, Sm4, and Sm5) are maintained without any change and a new thumbnail image is not generated. That is, a weighted value is generated at the first specific time point R, so that the thumbnail image (Sm6) farthest from the first specific time R is not acquired. Therefore, when the photographing mode is completed, a total of five thumbnail images remain during the photographing time (T1). The weighted value may be selected by a manufacture of the image photographing apparatus 10, or may be input by a user via the input unit 13 included with the image photographing apparatus 10.

Referring to FIG. 6, in the case where a weighted value is applied to a second specific time point R1 earlier than the first specific time point R2, a time interval between the second specific time point R1 and a time point of the new thumbnail image is shorter than a time interval D11 between the second specific time point R1 and a time point of the previously generated thumbnail image Sm1. In this case, the four previously generated thumbnail images (Sm2, Sm3, Sm4 and Sm5) and the new thumbnail image Sm6 are stored, and one previously generated thumbnail image Sm1 is temporally farthest from the second specific time point R1.

If the number of thumbnail images having the longest time interval at the specific time point is a plural number (i.e., more than one thumbnail image), any one of the thumbnail images may be selected at random. Thereafter, the earliest thumbnail image may be deleted, or the most recent thumbnail image may be deleted.

In another method, some thumbnail images among the previously generated thumbnail images may be selected and primarily preserved. For example, thumbnail images having been generated at an initial time of the photographing mode are managed in a manner that some thumbnail images are preferentially preserved. This preferential preservation may be established when a manufactured product is made, or may also be established by a user of the product.

If the first and second thumbnail images (Sn1, Sn2, respectively) are preferentially preserved, the five thumbnail images (Sn1, Sn2, Sn3, Sn4, and Sn5) are generated from the moving image file (n) during the photographing time from E0 to En. Thereafter, if the photographing mode is continued until a new thumbnail image (Sn6) is generated, three thumbnail images are selected from among the remaining thumbnail images (Sn3, Sn4, Sn5, and Sn6) other than the two preferentially preferred thumbnail images Sn1 and Sn2. In this case, the earliest thumbnail image Sn3 among the remaining thumbnail images (Sn3, Sn4, Sn5, and Sn6) is selected to be deleted and the remaining three thumbnail images are selected to be saved. After that, if the photographing mode is completed, a total of five thumbnail images (Sn1, Sn2, Sn4, Sn5 and Sn6) remain in the moving image file (n1) during the photographing time from E0 to En1.

Meanwhile, if the photographing mode is further continued until a new thumbnail image (Sn7) is generated, three thumbnail images are selected from among the remaining thumbnail images (Sn4, Sn5, Sn6 and Sn7) other than the preferentially preferred thumbnail images Sn1 and Sn2. At this time, the earliest one Sn4 of the remaining thumbnail images is deleted. Therefore, when the photographing mode is ended, a total of five thumbnail images (Sn1, Sn2, Sn5, Sn6 and Sn7) remain in the moving image file (n2) during the photographing time from E0 to En2.

Figure 7:
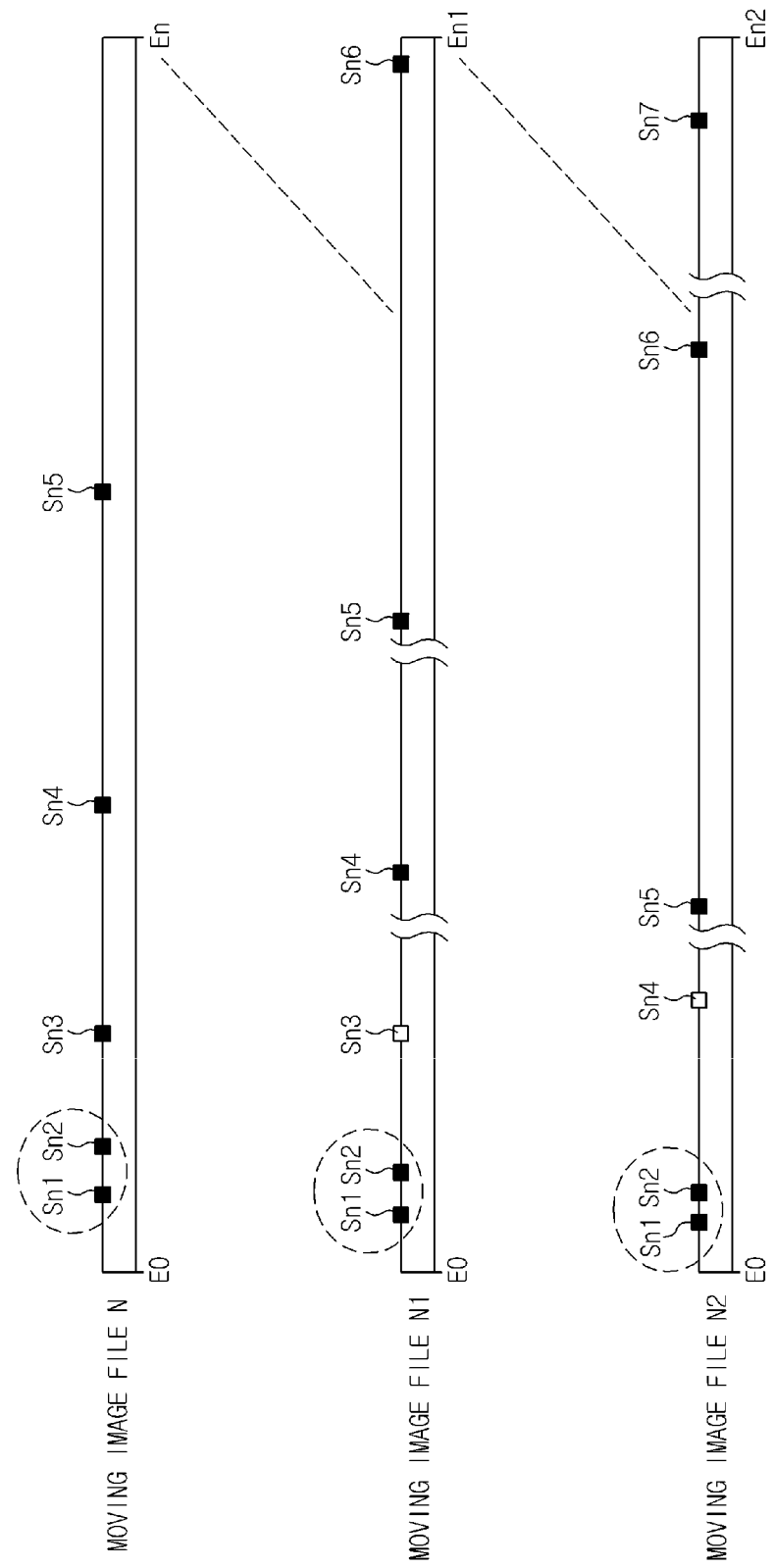
FIG. 7 is a conceptual diagram illustrating a method of selecting thumbnail images in a moving image file according to an exemplary embodiment of the present general inventive concept.

In accordance with the method of distinguishing between a thumbnail image to be maintained and another thumbnail image to be deleted after a new thumbnail image has been generated, the earliest one of the remaining thumbnail images other than the preferentially preferred thumbnail images is determined to be deleted as can be seen from FIG. 7, the scope or spirit of the exemplary embodiment of the present general inventive concept is not limited only to the above-mentioned method, and a thumbnail image to be deleted may be selected from among the remaining thumbnail images other than the specific thumbnail images according to a relative time interval between a specific time point and a generation time of each thumbnail image.

Figure 8:
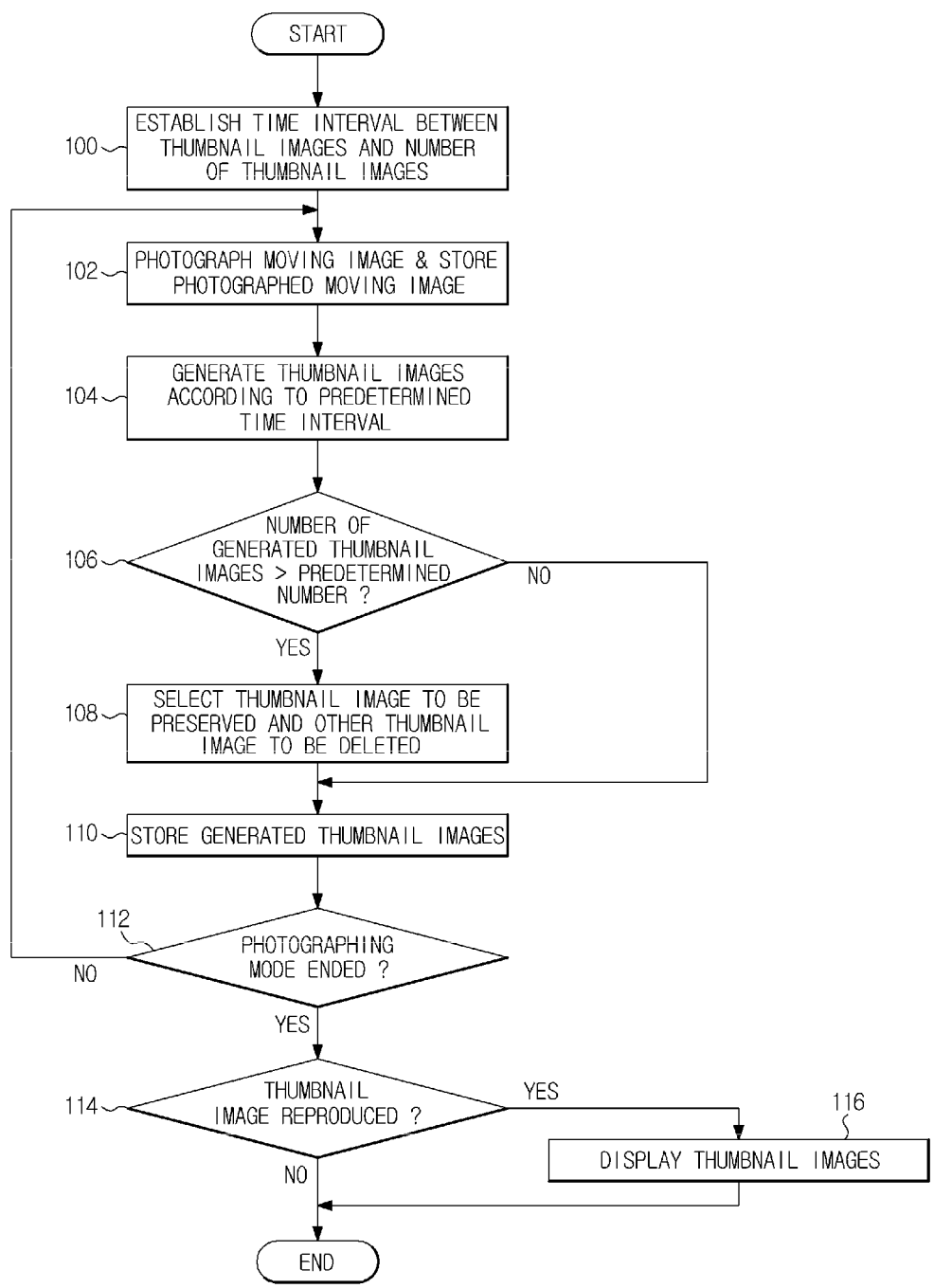
FIG. 8 is a flowchart illustrating a method of photographing a moving image according to an exemplary embodiment of the present general inventive concept.

FIG. 8 is a flowchart illustrating a method of photographing a moving image according to an exemplary embodiment of the present general inventive concept.

Referring to FIG. 8, a flowchart illustrating an exemplary method of photographing a moving image, is shown. When the moving image is photographed by the moving image photographing apparatus 10, the time interval between thumbnail images and the number of the thumbnail images may be established as a condition of generating the moving image in real time. This moving image generation condition may be established by a manufacturer who manufactures the moving image photographing apparatus 10 or may also be established by a user who uses the input unit 13 at operation 100.

Thereafter, if the user begins to photograph the moving image, the controller 30 stores moving image data photographed by the photographing unit 20 in the storage unit 50.

In this case, the moving image file stored in the storage unit 50 includes a header and image data at operation 102. As discussed above, the image data may include, but is not limited to, index information of a corresponding thumbnail image that indicates a location of the thumbnail image within the stored photographed moving image.

At operation 104, a time interval between thumbnail images is increased in proportion to the photographing time at the thumbnail generation condition established by the thumbnail generator 40, and a predetermined number of thumbnail images is generated. Generation of thumbnail images may be carried out in real time in conjunction with the moving image photographing. In order to increase a time interval between the thumbnail images, a sequences capable of increasing such a time interval between thumbnail images as compared to a previous time interval may be used, including, but not limited to, the Fibonacci sequence, and a time interval between thumbnail images that may be increased by $2^k$ times (where k=0, 1, 2, . . . ).

The controller 30 may determine whether the number of real-time generated thumbnail images is higher than a predetermined number. For example, if the moving image photographing mode reaches a generation time of a new thumbnail image after five thumbnail images have been generated according to the continuation of the photographing mode at operation 106, a thumbnail image to be maintained and another thumbnail image to be deleted are distinguished from each other at operation 108. Accordingly, a method of deleting the earliest thumbnail image among the previously generated thumbnail images and preserving the remaining thumbnail images and a new thumbnail image may be used.

In another method of distinguishing among thumbnail images, a weighted value may be given at a specific time point during the moving image photographing mode, as can be seen from FIG. 6. In more detail, a thumbnail image having the longest time interval from a specific time point to be weighted, i.e., the thumbnail image farthest from a specific time point, may be deleted. The weighted value may be selected by a manufacture of the image photographing apparatus 10, or may be input by a user via the input unit 13 included with the image photographing apparatus 10.

In yet another method of distinguishing among thumbnail images, some thumbnail images from among sequentially generated thumbnail images may be preferentially preserved, as shown in FIG. 7. For example, the earliest one of the remaining thumbnail images may be deleted, or a thumbnail image may be deleted in consideration of a time interval between a generation time of the thumbnail image and a specific time point. A preferred thumbnail to be saved may be selected by a user via the input unit 13. Alternatively, a condition may be pre-set by a user and/or manufacturer of the imaging apparatus 10. Thereafter, the controller 30 may automatically select a preferred thumbnail image to be saved based on the pre-set condition.

If the number of thumbnail images having the longest time interval at the specific time point is a plural number (i.e., more than one thumbnail image), any one of the thumbnail images may be selected at random, the earliest thumbnail image may deleted, or the most recent thumbnail image may be deleted.

If the number of thumbnail images is lower than the predetermined number, and/or if thumbnail selection is completed because the number of thumbnail images is higher than the predetermined number, the controller 30 stores thumbnail information that includes not only image data of each generated thumbnail image but also index information indicating where each generated thumbnail image is in the moving image in the storage unit 50 at operation 110. This thumbnail information may be stored in a header of the moving image file or be stored as an additional file, including an external file.

Thereafter, the controller 30 determines whether the user command indicating the end of the photographing mode is entered or not. If the user does not enter the command at operation 112, the moving image photographing mode is continued, and simultaneously the thumbnail images are continuously generated in real time.

If the user command to terminate the photographing mode is entered at operation 112, the controller 30 stops its operation to photograph and store the moving image, and determines whether a user command to reproduce the generated thumbnail image is entered or not. At this time, if the controller 30 receives no user command to reproduce the thumbnail image, the moving image photographing mode is terminated.

If the user command to reproduce the thumbnail image is input to the controller 30, the controller 30 displays not only text data 12a to display additional information related to the thumbnail images, but also a plurality of thumbnail images S1, S2, S3, S4 and S5 having been generated during the moving image photographing mode on the screen 12 shown in FIG. 3 using the predetermined number of thumbnail information units stored in the storage unit 50 at operation S116. As a result, the user can easily and rapidly search for a desired scene using the predetermined number of thumbnail images displayed on the screen 12.

Referring now to FIG. 9, a method of displaying thumbnail images generated according to a predetermined thumbnail generation condition is illustrated. The method begins in operation 900, and proceeds to operation 902 where a moving image is photographed. In operation 904, a predetermined thumbnail generation condition is determined. As discussed above, the predetermined thumbnail generation condition may be preset by a user of the moving image photographing apparatus 10, or may be preset by a manufacture of the moving image photographing apparatus 10. In operation 906, each generated thumbnail image is stored in a corresponding memory address i.e., storage area of the storage unit 50.

A time point of each stored thumbnail image, which corresponds to the photographed moving image is determined in operation 908. In operation 910, the controller 30 determines whether the thumbnail generation condition has been exceeded. If the thumbnail generation condition has not been exceeded, the thumbnail images are sequentially displayed from the earliest time point to the latest time point in operation 914, and the method ends at operation 916. If the thumbnail generation condition has been exceeded, the method proceeds to operation 912 where the first thumbnail image having the earliest time point is deleted from the corresponding storage area, and is replaced with a new thumbnail image having a time point being later then the remaining stored thumbnail images. Thereafter, the method proceeds to operation 914 where the thumbnail images, including the new thumbnail image, are displayed sequentially from the earliest time point to the latest time point in operation 914, and the method ends. Accordingly, even though a new thumbnail image may be stored in a storage area having a memory address that precedes the remaining stored thumbnail images, the thumbnail images may still be displayed sequentially, thereby being displayed consistent with the originally photographed moving image.

As apparent from the above description, exemplary embodiments of the present general inventive concept may provide a feature of adjusting a time interval between thumbnail images according to a moving image photographing time so as to limit the number of generated thumbnail images, thereby reducing the need to perform a process of additionally generating such thumbnail image after the moving image has been completely photographed. Accordingly, thumbnail images may be easily and quickly searched for desired scenes using a predetermined number of thumbnail images.

Although a few exemplary embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of photographing a moving image in which thumbnail images are generated from the photographed moving image during a duration of time, the method comprising:
    establishing a thumbnail generation condition including a number of thumbnail images to be displayed within the duration of time such that time intervals between each of the thumbnail images are each different from each other and less than the duration of time to generate the thumbnail images;
    limiting a number of thumbnail images being generated according to the established thumbnail generation condition while the moving image is photographed, such that a newest thumbnail replaces an oldest thumbnail in response to the established thumbnail generation condition being exceeded; and
    storing thumbnail information to reproduce the limited number of thumbnail images.

2. The method according to claim 1, wherein the thumbnail generation condition is established or changed by a user.

3. The method according to claim 1, wherein the thumbnail generation condition is established by a manufacturer who manufactures a moving image photographing apparatus having a function to photograph the moving image.

4. The method according to claim 1, wherein the limiting of the number of thumbnail images comprises allowing the number of generated thumbnail images not to exceed a predetermined number of thumbnail images by adjusting the time interval between the thumbnail images.

5. The method according to claim 4, wherein the adjusting of the time interval between the thumbnail images comprises increasing a time interval between newly generated thumbnail images as compared to a time interval between previously generated thumbnail images, as a moving image photographing time increases.

6. The method according to claim 5, wherein the increasing of the time interval between the thumbnail images comprises increasing the time interval between the newly generated thumbnail images using Fibonacci sequence.

7. The method according to claim 6, wherein the increasing of the time interval between the thumbnail images increases the time interval between the newly generated thumbnail images by $2^k$ times (where k=0, 1, 2, . . . ) as compared to the time interval between the previously generated thumbnail images.

8. The method according to claim 4, wherein the limiting of the number of thumbnail images comprises, if the number of generated thumbnail images exceeds a predetermined number of generated thumbnail images, selecting a predetermined number of thumbnail images from among the previously-generated and newly-generated thumbnail images.

9. The method according to claim 8, further comprising:
    selecting a plurality of replaceable thumbnails included in thumbnail images exceeding the predetermined number of thumbnail images;
    deleting the selected replaceable thumbnail images; and
    maintaining the remaining thumbnail images other than the selected replaceable thumbnail images.

10. The method according to claim 8, wherein the earliest thumbnail image from among the previously generated thumbnail images is selected as a thumbnail image to be deleted.

11. The method according to claim 7, further comprising:
    selecting a thumbnail image to be deleted by comparing time intervals among thumbnail images with one another at a specific time point where the moving image is photographed.

12. The method according to claim 11, wherein the specific time point is established or changed by a user.

13. The method according to claim 1, wherein the specific time point is established by a manufacturer who manufactures a moving image photographing apparatus having a function to photograph the moving image.

14. The method according to claim 11, further comprising:
    if the number of thumbnail images having the longest time interval at the specific time point is a plural number according to the result of the comparison of the time intervals among the thumbnail images, selecting any one of the thumbnail images at random, and deleting at least one of the earliest thumbnail image and the most recent thumbnail image.

15. The method according to claim 8, further comprising:
    maintaining a specific thumbnail image among the previously generated thumbnail images when the moving image is photographed, and selecting a thumbnail image to be deleted among the remaining thumbnail images other than the specific thumbnail image.

16. The method according to claim 15, wherein the selecting of the thumbnail image to be deleted among the remaining thumbnail images other than the specific thumbnail image comprises:
    selecting the earliest thumbnail image from among the remaining thumbnail images as a thumbnail image to be deleted.

17. The method according to claim 15, wherein the selecting of the thumbnail image to be deleted among the remaining thumbnail images other than the specific thumbnail image comprises:
    selecting a thumbnail image to be deleted by comparing time intervals among the remaining thumbnail images at the specific time point where the moving image is photographed.

18. The method according to claim 1, wherein the thumbnail information includes at least one of image data of the limited number of thumbnail images and an index indicating each position of the limited number of thumbnail images.

19. The method according to claim 18, wherein the thumbnail information is stored in at least one of a header of a file including the moving image and an external file.

20. An apparatus to photograph a moving image in which a thumbnail image is generated from the photographed moving image during a duration of time, the apparatus comprising:
    a photographing unit to photograph the moving image; and
    a controller to control an operation to store not only a limited number of thumbnail images generated according to a thumbnail generation condition including a number of thumbnail images to be displayed within the duration of time such that time intervals between each of the thumbnail images are each different from each other and less than the duration of time while the photographing unit photographs the moving image such that a newest thumbnail replaces an oldest thumbnail in response to the thumbnail generation condition being exceeded, but also thumbnail information to reproduce the limited number of thumbnail images.

21. The apparatus according to claim 20, further comprising:
a storage unit to store a file of the photographed moving image and the thumbnail information; and
an input unit to allow a user to establish the thumbnail generation condition.

22. The apparatus according to claim 20, wherein the thumbnail information includes image data of the limited number of thumbnail images and an index indicating each position of the limited number of thumbnail images, and wherein the thumbnail information is stored in at least one of a header of the moving image file and an external file.

23. The apparatus according to claim 20, wherein the controller comprises a thumbnail generator to generate the thumbnail images in real time when the moving image is photographed and to limit the number of generated thumbnail images not to exceed a predetermined number of thumbnail images.

24. The apparatus according to claim 23, wherein the thumbnail generator limits the number of thumbnail images by adjusting a time interval between the generated thumbnail images.

25. The apparatus according to claim 24, wherein the thumbnail generator increases a time interval between newly generated thumbnail images as compared to a time interval between previously generated thumbnail images, as a moving image photographing time increases.

26. The apparatus according to claim 24, wherein the thumbnail generator increases a time interval between newly generated thumbnail images using Fibonacci sequence.

27. The apparatus according to claim 24, wherein the thumbnail generator increases a time interval between newly generated thumbnail images by $2^k$ times (where k=0, 1, 2, . . . ) as compared to a time interval between previously generated thumbnail images.

28. The apparatus according to claim 24, wherein the thumbnail generator, if the number of generated thumbnail images exceeds the predetermined number of generated thumbnail images, selects a predetermined number of thumbnail images from among the previously-generated and newly-generated thumbnail images.

29. The apparatus according to claim 28, wherein the thumbnail generator selects at least one thumbnail image as a thumbnail image to be deleted in response to a number of thumbnail images exceeding the predetermined number of thumbnail images, and maintains the remaining thumbnail images other than the selected thumbnail images.

30. The apparatus according to claim 28, wherein the thumbnail generator selects the earliest thumbnail image from among the previously generated thumbnail images as a thumbnail image to be deleted.

31. The apparatus according to claim 28, wherein the thumbnail generator selects a thumbnail image to be deleted by comparing time intervals among thumbnail images with one another at a specific time point where the moving image is photographed.

32. The apparatus according to claim 31, wherein the thumbnail generator, if the number of thumbnail images having the longest time interval at the specific time point is a plural number according to the result of the comparison of the time intervals among the thumbnail images, selects any one of the thumbnail images at random, and deletes at least one of the earliest thumbnail image and the most recent thumbnail image.

33. The apparatus according to claim 28, wherein the thumbnail generator maintains a specific thumbnail image among previously generated thumbnail images when the moving image is photographed, and selects a thumbnail image to be deleted among the remaining thumbnail images other than the specific thumbnail image.

34. The apparatus according to claim 33, wherein the thumbnail generator selects the earliest thumbnail image from among the remaining thumbnail images other than the specific thumbnail image as a thumbnail image to be deleted.

35. The apparatus according to claim 33, wherein the thumbnail generator selects a thumbnail image to be deleted by comparing time intervals among the remaining thumbnail images other than the specific thumbnail image at the specific time point where the moving image is photographed.

36. A method of displaying thumbnail images corresponding to a photographed moving image during a duration of time, the method comprising:
generating a plurality of original thumbnail images based on the photographed moving image according to a predetermined thumbnail generation condition including a number of thumbnail images to be displayed within the time period such that such that time intervals between each of the thumbnail images are each different from each other and less than the duration of time;
storing each thumbnail image among the plurality of original thumbnail images in a corresponding storage area among a plurality of storage areas;
determining a time point of each stored thumbnail image corresponding to a point in time of the moving image;
replacing a first thumbnail image having an earliest time point among the plurality of original thumbnail images with a new thumbnail image having a latest time point among the plurality of thumbnail images in response to exceeding the predetermined thumbnail generation condition; and
sequentially displaying the thumbnail images based on the corresponding time points,
wherein the new thumbnail image having the latest time point is displayed after displaying the plurality of original thumbnail images.

37. An apparatus to photograph an object image during a time period, comprising:
a photograph unit to photograph an object image; and
a controller to generate one or more still images corresponding to the photographed object image and based on a predetermined thumbnail generation condition including a number of thumbnail images to be displayed within the time period such that time intervals between each of the thumbnail images are each different from each other and less than the time period,
wherein the controller determines the number of still images according to the predetermined thumbnail generation condition such that a newest thumbnail replaces an oldest thumbnail in response to the predetermined thumbnail generation condition being exceeded.

38. The apparatus of claim 37, wherein the wherein the controller limits the number of still images by adjusting a time interval between the generated still images.

39. The apparatus of claim 38, wherein the controller increases a time interval between newly generated still images as compared to a time interval between previously generated still images, as a moving image photographing time increases.

40. The apparatus according to claim 38, wherein the controller selects a still image to be deleted by comparing time intervals among still images with one another at a specific time point where the moving image is photographed.

* * * * *